United States Patent
Yagi et al.

(10) Patent No.: US 11,661,638 B2
(45) Date of Patent: May 30, 2023

(54) RECOVERY OF NICKEL AND COBALT FROM LI-ION BATTERIES OR THEIR WASTE

(71) Applicant: Umicore, Brussels (BE)

(72) Inventors: Ryohei Yagi, Olen (BE); Lennart Scheunis, Olen (BE)

(73) Assignee: UMICORE, Brussels (BE)

( * ) Notice: Subject to any disclaimer, the term of this patent is extended or adjusted under 35 U.S.C. 154(b) by 0 days.

(21) Appl. No.: 17/743,507

(22) Filed: May 13, 2022

(65) Prior Publication Data

US 2022/0403483 A1 Dec. 22, 2022

(30) Foreign Application Priority Data

May 26, 2021 (EP) .................................. 21176046

(51) Int. Cl.
| | | |
|---|---|---|
| *C22B 23/02* | (2006.01) | |
| *C22B 7/00* | (2006.01) | |
| *H01M 4/525* | (2010.01) | |
| *H01M 10/0525* | (2010.01) | |
| *H01M 10/54* | (2006.01) | |

(52) U.S. Cl.
CPC .............. *C22B 23/02* (2013.01); *C22B 7/001* (2013.01); *H01M 4/525* (2013.01); *H01M 10/0525* (2013.01); *H01M 10/54* (2013.01)

(58) Field of Classification Search
CPC ........ C22B 23/02; C22B 7/001; H01M 4/525; H01M 10/0525; H01M 10/54
USPC ........................................................... 75/627
See application file for complete search history.

(56) References Cited

U.S. PATENT DOCUMENTS

| | | | | |
|---|---|---|---|---|
| 3,043,681 | A * | 7/1962 | Senior ........................ | C22B 5/00 420/71 |
| 7,169,206 | B2 * | 1/2007 | Cheret ................... | C22B 23/023 75/10.19 |
| 10,294,546 | B2 | 5/2019 | Takahashi et al. | |
| 2014/0060250 | A1 * | 3/2014 | Takahashi ............ | C22B 21/0084 75/414 |
| 2014/0318313 | A1 * | 10/2014 | Takahashi ............. | H01M 10/54 75/10.53 |
| 2016/0023778 | A1 * | 1/2016 | Zhao .................... | G03B 17/561 396/12 |
| 2017/0229744 | A1 * | 8/2017 | Heulens .................. | C22B 4/005 |
| 2021/0328283 | A1 | 10/2021 | Yamashita et al. | |

FOREIGN PATENT DOCUMENTS

| | | | | |
|---|---|---|---|---|
| AU | 3278378 | A | 5/1978 | |
| CN | 1046191 | A * | 10/1990 | |
| CN | 103924088 | A | 7/2014 | |
| CN | 111129632 | A | 5/2020 | |
| EP | 3269832 | A1 * | 1/2018 | ............. C22B 23/02 |
| EP | 3269832 | A1 | 1/2018 | |
| WO | 2012140951 | A1 | 10/2012 | |
| WO | WO-2012140951 | A1 * | 10/2012 | ............. C21B 11/10 |
| WO | 13080266 | A1 | 6/2013 | |
| WO | WO-2013080266 | A1 * | 6/2013 | ......... C22B 21/0069 |
| WO | WO-2016141875 | A1 * | 9/2016 | ............. C22B 23/02 |
| WO | 2017121663 | A1 | 7/2017 | |
| WO | 2020013294 | A1 | 1/2020 | |

OTHER PUBLICATIONS

Elwert, T., et al., "Phase composition of high lithium slags from the recycling of lithium-ion batteries", World of Metallurgy-Erzmetall, vol. 65, No. 3, 2012, 9 pages.

Hu, X., et al., "Recovery of Co, Ni, Mn, and Li from Li-ion batteries by smelting reduction-Part II: A pilot-scale demonstration", Journal of Power Sources, vol. 483, 2021, 12 pages.

Vest, M., et al., "Slag design for lithium recovery from spent batteries", Int. Work. Met. Interact., vol. 9, No. 93, 2010, pp. 93-106.

Wittkowski, A., et al., "Speciation of Manganese in a Synthetic Recycling Slag Relevant for Lithium Recycling from Lithium-Ion Batteries", Metals, vol. 11, No. 2, Jan. 2021, 22 pages.

* cited by examiner

*Primary Examiner* — Melissa S Swain
(74) *Attorney, Agent, or Firm* — NK Patent Law

(57) ABSTRACT

The present invention lies in the field of pyrometallurgy and discloses a process and a slag suitable for the recovery of Ni and Co from Li-ion batteries or their waste. The slag composition is defined according to:

10%<MnO<40%;

$(CaO+1.5*Li_2O)/Al_2O_3 > 0.3$;

$CaO+0.8*MnO+0.8*Li_2O < 60\%$;

$(CaO+2*Li_2O+0.4*MnO)/SiO_2 \geq 2.0$;

$Li_2 \geq 1\%$; and, $Al_2O_3+SiO_2+CaO+Li_2O+MnO+FeO+MgO > 85\%$.

This composition is particularly adapted to limit or avoid the corrosion of furnaces lined with magnesia-bearing refractory bricks.

13 Claims, No Drawings

RECOVERY OF NICKEL AND COBALT FROM LI-ION BATTERIES OR THEIR WASTE

The present invention lies in the field of pyrometallurgy and concerns more particularly the recovery of Ni and Co from Li-ion batteries or their waste.

Electric vehicles have seen unprecedented growth in recent years, among others driven by new legislation in Europe and China, designed to gradually reduce the $CO_2$ footprint of car fleets and to limit the air pollution in cities. This growth is expected to continue during the next decades. The adoption of electric vehicles greatly depends on the performance of batteries used to store electric energy. To obtain the highest energy density while keeping the costs under control, currently rechargeable Li-ion batteries are a preferred choice. Many of these batteries contain cathodes based on the transition metals Ni, Mn and Co, and are therefore also known as NMC batteries. With the growth of the electric mobility market, also the demand for these metals is expected to increase significantly.

The demand for Ni and Co may even surpass the worldwide production capacity. Co is particularly critical as it is only produced as a by-product of the Ni and Cu industry today. The nickel market is significantly larger than the cobalt market. Most of the Ni goes to the production of stainless steel, where the purity of Ni is less important. High purity Ni and high purity Co metals or compounds are however already in short supply. In view of the above, recovering Ni and Co from spent Li-ion batteries or their waste is therefore an attractive proposal.

There are a few known processes for recycling Li-ion batteries, wherein nickel, cobalt and copper oxides are reduced to metal and concentrated in an alloy phase at high temperature.

WO2017121663 describes slag compositions produced in an industrial process and discloses an effect of MnO on slag viscosity and cobalt recovery. The main slag components described therein are CaO, $SiO_2$, $Al_2O_3$, $Li_2O$, and MnO ($MnO_2$). Disclosed MnO-concentrations in those slags are very low and the teaching of the above is to limit the amount of MnO in the slag. Elwert et al. (Phase composition of high lithium slags from the recycling of lithium-ion batteries: World of Metallurgy-ERZMETALL, vol. 65 (3), 2012, pp. 163-171) analyses the phase composition of three different slags with the objective to develop possible slag beneficiation processes for lithium recovery. Hu et al. (Recovery of Co, Ni, Mn, and Li from Li-ion batteries by smelting reduction-Part II: A pilot-scale demonstration:Journal of Power Sources, vol. 483, 2021, 229089) proposes a recycling process for Li-ion batteries by smelting them with fluxing agents at temperatures above 1500° C., resulting in a slag and an alloy containing Ni, Co, and Mn. Both Elwert and Hu describe slag compositions with MnO-concentrations well below 10%.

Recent Li-ion batteries, on the other hand, typically contain an increasing amount of Mn. This makes the formation of slags with small amounts of Mn more difficult, as it would require diluting the Mn by addition of large amounts of fluxing agents or to choose more reducing conditions for such processes to send more Mn to the alloy phase instead of to the slag phase. The former option increases the consumption of fluxing agents and the total amount of obtained slag, whereas the latter option increases the complexity of any following hydrometallurgical treatment of the alloy due to its higher Mn content. Both options would significantly degrade the economy of the process.

WO12140951, WO13080266 and WO20013294 propose processes to recycle Li-ion battery scrap to recover Ni and Co, while fixing impurities such as Fe and P in the slag phase. Although stating that Mn could be a main component of the obtained slag, a preferred range or particular effect of MnO in such slags is not specified. Moreover, the focus of WO12140951 and WO13080266 is on low-melting, Fe-rich slags.

Vest et al. (Friedrich Slag design for lithium recovery from spent batteries:Int. Work. Met. Interact., vol. 9 (93), 2010, pp. 93-106.) describes theoretical calculations of MnO-rich slags. Wittkowski et al. (Speciation of Manganese in a Synthetic Recycling Slag Relevant for Lithium Recycling from Lithium-Ion Batteries:Metals, vol. 11(2), 2021, p. 188.) analyses the phase composition of different Li-containing slags from the recycling of Li-ion batteries.

CN103924088 and EP3269832 describe bath smelting processes for waste batteries, producing a Co and/or Ni containing alloy and a $SiO_2$ and MnO-rich slag.

None of the above prior art teaches a slag composition according to the present invention.

Even when disclosing slags with a relatively higher content of MnO, all of the above documents do not teach the present process conditions and remain silent about any effect of the resulting MnO-rich slag compositions on the walls of the furnace. Typically, furnace walls are made of refractory bricks. Main composition of such bricks is magnesia. Examples are magnesia bricks (content of magnesia normally above 90%) or magnesia-chrome bricks (content of magnesia normally 50-70%). It has been observed that magnesia from the walls is dissolved by common slags during operation of the furnace, resulting in wear or corrosion of the furnace walls over time. This is a recurring problem, resulting in high maintenance costs, as the furnace needs to be shut down and the refractory bricks need to be replaced at regular intervals. The problem is even more pronounced at higher operating temperatures, such as for example above 1550° C.

It is therefore an aim of the present invention to provide a process for the recovery of Ni and Co from Li-ion batteries, which at the same time increases the lifetime of a furnace, by operating with a dedicated MnO— and $Li_2O$-rich slag system composed in a way that magnesia-bearing refractory bricks are less corroded during operation. The achieved wear reduction contributes nicely to the overall economy of the present process.

According to a first embodiment, the process for the recovery of Ni and Co from Li-ion batteries or their waste, comprises the steps:

providing a furnace lined with magnesia-bearing refractory bricks;

providing a charge comprising slag formers, and the Li-ion batteries or their waste; and, smelting the charge in reducing conditions, thereby obtaining an alloy containing the major part of the Ni and Co, and a slag;

characterized in that the slag has a percent composition by mass according to:

$10\% < MnO < 40\%$;

$(CaO + 1.5*Li_2O)/Al_2O_3 > 0.3$;

$CaO + 0.8*MnO + 0.8*Li_2O < 60\%$;

$(CaO + 2*Li_2O + 0.4*MnO)/SiO_2 \geq 2.0$;

$Li_2O \geq 1\%$; and, $Al_2O_3 + SiO_2 + CaO + Li_2O + MnO + FeO + MgO > 85\%$.

By "slag formers" are meant: one or more of for example CaO, $Al_2O_3$ and $SiO_2$. Other slag formers, well known to the skilled person, may also be present. The slag forming compounds may be added as such, or they may be obtained in situ from easily oxidized metals present in the charge, such as aluminium.

By "Li-ion batteries or their waste" are, for example, meant: new or waste Li-ion batteries, spent or end-of-life batteries, production or battery scrap, electrode materials or pre-processed battery materials, such as after shredding or sorting, including so-called "black mass". These should however still contain appreciable amounts of Co and/or Ni.

By "major part" of an element or compound is meant: more than 50% by weight of the corresponding amount present in the charge. It may also include a range with a lower value selected from 55%, 60%, 65%, 70% and 75%, and an upper value selected from 80%, 85%, 90%, 95% and 100%.

The content of MnO in the slag has a key role in the present invention. A minimum of around 10% in the slag is needed to see the effect of suppressing MgO dissolution into the slag from magnesia-bearing refractory bricks lining the furnace. Having at least 15% MnO is preferred. It is moreover beneficial to have a MnO content of 10-40% in a relatively small amount of slag, as a decrease in volume of the slag supports suppressing the MgO dissolution. On the other hand, the addition of more fluxing agents, thereby increasing the overall volume of the slag and diluting the percentage of MnO increases the amount of MgO dissolving from the refractory bricks and thus has a negative influence.

Also, the upper limit of MnO in the slag is important, as it helps to keep the melting temperature of the slag sufficiently low. Slags containing up to 40% MnO according to the invention melt below 1500° C. Lower temperatures are beneficial for suppressing MgO dissolution from the magnesia-bearing refractory bricks in combination with the MnO amount. Amounts of MnO exceeding 40% increase the melting point of the slag above 1500° C., especially when the slag also contains relatively larger amounts of $Al_2O_3$, such as above 50%, and is thus less preferred.

According to a further embodiment, the content of MnO in the slag is greater than 10% and less than or equal to 30%.

Percentages for Mn in the slag are standardized as "percent of MnO". The exact oxidation state of Mn is, however, not always well-defined in such slags. Manganese oxide ("MnO") may thus also represent a mixture of the mono-species MnO with manganese dioxide, $MnO_2$. The share of mono-species MnO is, however, assumed to be well above 95%, particularly under the chosen reducing reaction conditions.

MnO typically has a green color, while $MnO_2$ typically has a black-brown or black-grey color, leading to its name "manganese black". Only if the content of the mono-species is high enough, the green color will be visible.

According to a further embodiment, the content of CaO in the slag is greater than or equal to 15%, preferably greater than or equal to 20%.

According to a further embodiment, the content of CaO in the slag is less than or equal to 50%, preferably less than or equal to 30%.

A minimum of 15% CaO keeps the slag sufficiently fluid and ensures that it can be easily handled. Higher amounts of CaO, such as 20% or more, are preferred, as CaO helps to suppress the dissolution of Mg from the magnesia-bearing refractory bricks, as Ca and Mg share similar chemical sites in the slag. Operating the process with a preferred upper limit of 30% CaO helps to keep the melting temperature of the slag below 1600° C. A too high amount of CaO, such as above 50%, significantly increases the melting temperature of the slag and thus should be avoided.

It has further been observed that in addition to MnO and CaO, $Li_2O$ also suppresses the dissolution of Mg from the magnesia-bearing refractory bricks, while increasing amounts of $SiO_2$ has a negative effect. This is reflected in the equation $(CaO+2*Li_2O+0.4*MnO)/SiO_2 \geq 2.0$. When recycling Li-ion batteries, the amount of $Li_2O$ in the slag is expected to be significant.

According to a further embodiment, the content of $Al_2O_3$ in the slag is less than or equal to 50%, preferably less than or equal to 40%, as too high amounts of $Al_2O_3$ increase the melting point of the slag.

According to a further embodiment, the content of Fe in the slag is less than or equal to 25%, preferably less than or equal to 10%.

According to a further embodiment, the sum of $Al_2O_3$, $SiO_2$, CaO, $Li_2O$, MnO, FeO and MgO is greater than or equal to 90%, preferably greater than or equal to 95% or more.

According to a further embodiment, $(CaO+2*Li_2O+0.4*MnO)/(SiO_2+0.2*Al_2O_3)$ is $>1.5$.

Slag composition and operating temperature are critical considerations for the process described herein. The present invention achieves a balance between compounds that protect the furnace walls (e.g. MnO, CaO, $Li_2O$), and compounds that negatively impact the furnace walls, while being either unavoidable (e.g. $Al_2O_3$ from Al in the feed) or otherwise necessary (e.g. $SiO_2$ needed to lower the melting point of the slag). The slag composition domain moreover allows for a suitable fluidity of the slag and minimal overheating of the slag at the desired operating temperature. A temperature as low as possible is preferred, while still remaining above the melting point of the alloy.

This balance is reflected in the presented process conditions as well as in the composition of the slag itself.

According to a further embodiment, the step of smelting the charge is performed at a temperature of at least 1400° C., to ensure complete melting of the metallurgical charge, and at most 300° C. above the liquidus point of the slag, preferably at most 100° C. above the liquidus point of the slag. The lower limit is preferred to avoid even partial solidification of the produced alloy and slag. The upper limit is preferred to avoid overheating the slag. Higher temperatures promote the dissolution of Mg from the magnesia-bearing refractory bricks. Therefore, lower temperatures are generally preferred for wear-reduction as well as to save energy. Overheating the slag has a negative impact on the dissolution of magnesia-bearing refractory bricks by the slag.

The described ratio of CaO and $Li_2O$ over $Al_2O_3$ in the slag helps to keep the melting point of the slag sufficiently low, preferably below 1700° C., more preferably below 1650° C., even more preferably below 1600° C., and most preferably below 1550° C.

Despite their beneficial effect for the lifetime of the magnesia-bearing refractory bricks, restricting the combined amounts of CaO, MnO and $Li_2O$ in the slag is equally relevant, as the melting point of the slag would become too high when $CaO+0.8*MnO+0.8*Li_2O$ exceeds 60%.

According to a further embodiment, the smelting step comprises the further steps:
sampling the slag;
cooling down the slag sample and assessing its color; and,
in case the slag sample is green, terminating the smelting step; or, in case the slag sample is not green, proceeding with the smelting step after adjusting the $pO_2$-level to achieve more reducing conditions.

By "sampling the slag" is meant to take a small sample of the slag and assess its color, while the process continues under the chosen conditions.

The assessment of the color can easily be performed visually. Compared to a chemical analysis of the slag, monitoring the change of color provides for a quick and efficient indication that the slag contains a certain minimum percentage of MnO. As will be described in greater detail below, it has further been observed that the green color of the slag also indicates that the major part of Co contained in the feed is reduced, reporting to the alloy. Without being bound by theory, it is indeed believed that the change of color to green results from the reduction of $MnO_2$ to MnO, but also from the reduction of typically darker oxides of, for example, Ni and Co.

The visual inspection is a quick and easy way to know whether process conditions should be adjusted, optimized and/or ended, which can save time and operational costs. The color check is thus a reliable indication of the progress of the metallurgical operation.

In the present context, "green" is defined as the color with Hue, Lightness, and Chroma in the following range according to the ASTM D1535-14 (2018) standard:

Hue from 5GY to 5BG;
Lightness: ≥2; and,
Chroma: ≥3.

Examples of green color are shown in "Geological Rock-Color Chart with Genuine Munsell Color Chips" produced by Munsell Color in 2009.

The operating conditions are chosen to oxidize a major part of Mn to the slag and to reduce the major part of Co and Ni to the alloy. Preferably >90% of Co and Ni are collected in the alloy, more preferred >95%, and most preferred >98% to make the process most economic. The $pO_2$-level of the present process is readily adjusted to reach these favourable yields.

According to a further embodiment, the $pO_2$-level is adjusted to $10^{-7} > pO_{2 \geq 10}^{-12}$, preferably to $pO_2 \geq 10^{-8}$, more preferred to $pO_2 < 10^{-8.5}$, and most preferred to $pO_2 < 10^{-9}$.

The preferred $pO_2$-levels of $10^{-8}$, $10^{-8.5}$ and $10^{-9}$, as well as the limit of $10^{-12}$ thus represent more reducing conditions as compared to a $pO_2$-level of $10^{-7}$.

According to a further embodiment, the color of the slag is green. During smelting the charge in reducing conditions, the color of the slag typically changes from black-grey or black-brown to green as the process progresses.

According to a further embodiment, the furnace is an electric furnace. Using an electrical furnace or electric arc furnace (EAF) allows for more flexibility in case higher operating temperatures are desired or needed. Another advantage is that it allows to profit from of off-peak electricity pricing, or electricity produced by eco-friendly green sources, such as local wind power plants.

Generally, operating temperatures for a furnace used for smelting Li-ion batteries or their waste are about 1400 to 1750° C.

According to a further embodiment, a Li-containing metallurgical slag comprises a percent composition by mass according to:

10%<MnO<40%;

$(CaO+1.5*Li_2O)/Al_2O_3 > 0.3$;

$CaO+0.8*MnO+0.8*Li_2O < 60\%$;

$(CaO+2*Li_2O+0.4*MnO)/SiO_2 2.0$;

$Li_2O \geq 1\%$; and, $Al_2O_3+SiO_2+CaO+Li_2O+MnO+FeO+MgO > 85\%$.

According to a further embodiment, the Li-containing metallurgical slag has a green color.

According to a further embodiment, the content of MnO in the Li-containing metallurgical slag is greater than 10% and less than or equal to 30%.

According to a further embodiment, the content of CaO in the Li-containing metallurgical slag is greater than or equal to 15%, preferably greater than or equal to 20%.

According to a further embodiment, the content of CaO in the Li-containing metallurgical slag is less than or equal to 50%, preferably less than or equal to 30%.

According to a further embodiment, the content of $Al_2O_3$ in the Li-containing metallurgical slag is less than or equal to 50%, preferably less than or equal to 40%.

According to a further embodiment, the content of Fe in the Li-containing metallurgical slag is less than or equal to 25%, preferably less than or equal to 10%. In an FeO-rich slag containing more than 10% FeO, respectively containing even more than 20% FeO, CoO cannot be reduced to metallic Co without also transferring relatively large quantities of metallic Fe to the alloy phase. This significantly increases the costs of any hydrometallurgical follow-up treatment of the resulting alloy and is thus less desired.

According to a further embodiment, the Li-containing metallurgical slag is used as slag former in a pyrometallurgical recycling process. The obtained metallurgical slag contains CaO and $SiO_2$, and thus can be used as slag former in new operations.

According to a further embodiment, the Li-containing metallurgical slag is used as slag former in the process according to the first embodiment, thereby partially or fully replacing slag formers in the step of providing a charge comprising slag formers.

Re-using the produced metallurgical slag in new operations allows for a greater flexibility in choosing operating conditions, such as the $pO_2$-level of the process. For example, when more oxidizing conditions were used, thereby sending more Co and/or Ni to the slag, these valuable metals would not be lost, but rather would be recovered in a new operation cycle, where perhaps more reducing conditions would be used to recover more of the Co and/or Ni.

When re-using this metallurgical slag as slag former in a new process or as starting slag for the same process, it should be taken into account that incoming batteries or their waste may contain additional amounts of compounds such as Al, Mn or Li, which will end up in the slag after their oxidation. Consequently, the respective amounts of $Al_2O_3$, MnO or $Li_2O$ in the slag will increase. While the amount of $Li_2O$ is considered less critical, the amounts of $Al_2O_3$ and MnO have a more direct influence on the melting temperature. In a further embodiment, the preferred upper limit for MnO is 30% to allow a margin for incoming fresh MnO from a new charge.

Due to incoming fresh compounds, the metallurgical slag according to the invention can only be re-used for a limited number of cycles. To decide whether the slag can continue to be reused, the slag composition should be analysed and compared with the composition specifications described herein. Bleeding and re-using at least part of the metallurgical slag, diluting it with fresh slag formers, is available as a viable long-term option.

As described above, the slag according to the invention helps to suppress the dissolution of MgO from the refractory bricks significantly. However, it cannot be avoided completely. This leads to another positive side effect when recycling the slag. Dissolved MgO from the refractory bricks (brought about by minor dissolution of MgO during previous smelting processes) accumulates in the slag, and this tends to suppress, in combination with MnO, $Li_2O$ and CaO, the further corrosion of the refractory bricks. This makes the re-use of the obtained slag particularly attractive.

The following examples are provided to further illustrate embodiments of the present invention.

Example 1

The dissolution of MgO from the walls of magnesia-bearing crucibles was measured, when using several different slag compositions. Various compounds contained in Li-ion batteries or their waste, respectively their oxides such as FeO, $Al_2O_3$, $Li_2O$ and MnO, were melted together with CaO and $SiO_2$ as fluxing agents in a 1 L MgO crucible. The total weight of added oxides was 1000 g. The ratio of FeO, $Al_2O_3$, $Li_2O$, and MnO was chosen to represent a typical composition of existing Li-ion batteries.

The crucibles were gradually heated at heating rate of 150° C./h using an induction furnace. When the slags were fully molten, crucibles were kept at temperatures of 1400, 1450, or 1500° C. After 2 h of heating, molten slags were taken out of the crucibles, and quenched with water. Table 1 lists the composition of the obtained slags in this example.

TABLE 1

| | | Composition of the obtained slags | | | | | | | |
|---|---|---|---|---|---|---|---|---|---|
| Slag | Temp. ° C. | Composition (%) | | | | | | | Condition (CaO + 2*Li2O + 0.4*MnO)/SiO2 |
| | | $SiO_2$ | FeO | $Al_2O_3$ | CaO | $Li_2O$ | MgO | MnO | |
| 1-1 | 1450 | 15.8 | 3.6 | 20.5 | 34.2 | 1.0 | 2.5 | 22.3 | 2.8 |
| 1-2 | 1450 | 19.7 | 1.6 | 18.7 | 19.7 | 2.9 | 2.3 | 35.3 | 2.0 |
| 1-3 | 1400 | 17.7 | 0.0 | 19.6 | 47.1 | 1.0 | 1.9 | 12.7 | 3.1 |
| 1-4 | 1400 | 23.8 | 0.0 | 19.8 | 24.7 | 19.8 | 1.1 | 10.8 | 2.9 |
| 1-5 | 1500 | 19.2 | 1.9 | 16.3 | 21.1 | 19.2 | 0.9 | 18.2 | 3.5 |
| 1-6 | 1500 | 18.6 | 0.9 | 8.8 | 10.6 | 29.4 | 1.4 | 28.4 | 4.3 |
| 1-7 | 1500 | 9.2 | 2.7 | 11.9 | 1.8 | 33.0 | 3.9 | 32.7 | 8.8 |

MgO concentrations in above slags were relatively low (from 0.9% to 3.9%). This result indicates that a dissolution of MgO from the wall of the crucible was well-suppressed under the chosen conditions.

The experiments were performed with slag compositions having no Ni, Co or Cu, since the amount of these metals in the final slags are typically very low and thus essentially do not influence the slag properties.

Comparative Example 2

The dissolution of MgO from the walls of magnesia-bearing crucibles was measured, when using different slag compositions. Various compounds contained in Li-ion batteries or their waste, respectively their oxides such as FeO, $Al_2O_3$, and MnO, were melted together with CaO and $SiO_2$ as fluxing agents, in a 1 L MgO crucible. The total weight of added oxides was 1000 g.

The crucibles were gradually heated at a heating rate of 150° C./h using an induction furnace. When the slags were fully molten, crucibles were kept at temperatures of 1400 or 1450° C. for 2 h. After 2 h of heating, molten slags were taken out of the crucibles, and quenched with water. Table 2 lists the composition of the obtained slags in this example.

TABLE 2

| | | Composition of the obtained slags | | | | | | | |
|---|---|---|---|---|---|---|---|---|---|
| Slag | Temp. ° C. | Composition (%) | | | | | | | Condition (CaO + 2*Li2O + 0.4*MnO)/SiO2 |
| | | $SiO_2$ | FeO | $Al_2O_3$ | CaO | $Li_2O$ | MgO | MnO | |
| 2-1 | 1450 | 31.0 | 3.4 | 20.3 | 11.5 | 0.9 | 11.6 | 21.3 | 0.7 |
| 2-2 | 1450 | 27.1 | 1.3 | 16.1 | 9.3 | 2.5 | 13.2 | 30.4 | 1.0 |
| 2-3 | 1400 | 32.0 | 0.0 | 18.2 | 32.0 | 0.0 | 8.7 | 9.1 | 1.1 |

Compared to the slags 1-1 to 1-3 used in Example 1, here the $SiO_2$ content in the slags was adjusted to be higher, while the content of CaO, $Li_2O$ and/or MnO was adjusted to be lower. Measured MgO concentrations in above slags were relatively high (from 8.7% to 13.2%), which indicates that relatively large quantities of MgO from the crucibles were dissolved in the respective slags. As with Example 1, the slags contained no Ni, Co or Cu.

Discussion of Examples 1 and 2

The slags obtained in Example 1 contained less MgO than the slags obtained in Comparative Example 2. No visible degradation of the MgO crucible was observed under the conditions of Example 1, whereas the crucible walls became thinner under the conditions of Example 2. Slags containing relatively low concentrations of $SiO_2$ and relatively high combined concentrations of $Li_2O$, CaO, and/or MnO suppressed the MgO dissolution, as demonstrated in Example 1. More specifically, the MgO dissolution into the slag was efficiently suppressed when the ratio (CaO+2 $Li_2O$+0.4 MnO)/$SiO_2$ was 2 or higher.

Example 3

500 kg of spent rechargeable Li-ion batteries were fed to a furnace with a diameter of 1 m, freshly lined with 200 mm chrome-magnesia refractory bricks. 80 kg of limestone and 20 kg of sand were added together with the Li-ion batteries. A bath temperature of 1450-1500° C. was maintained, which is suitable to maintain both the slag and the alloy sufficiently fluid for easy tapping and handling. The heat was supplied by the oxidation of Al and C in the batteries, using submerged $O_2$ injection. The injection rate was chosen to guarantee strongly reducing conditions, i.e. $pO_2$ of $10^{-9}$. Natural gas was added to compensate for heat losses in the furnace. After 1 h of heating, the produced alloy and slag were separated by tapping. Table 3 shows the analyses of the input and output phases of the process.

TABLE 3

Input and output phases of the process

| | Mass (kg) | Composition (%) | | | | | | | | | | |
|---|---|---|---|---|---|---|---|---|---|---|---|---|
| | | Ni | Co | Cu | Fe | $SiO_2$ | CaO | Al ($Al_2O_3$) | Li ($Li_2O$) | Mn (MnO) | C | MgO |
| Input | | | | | | | | | | | | |
| Batteries | 500 | 26.3 | 7.0 | 12.3 | 3.5 | — | — | 5.0 | 2.0 | 7.0 | 15 | — |
| Limestone | 80 | — | — | — | — | 4.8 | 53.3 | — | — | — | 11.4 | — |
| Silica | 20 | — | — | — | — | 100 | — | — | — | — | — | — |
| Output | | | | | | | | | | | | |
| Alloy | 243 | 54.3 | 14.1 | 25.0 | 5.5 | — | — | — | — | 1.1 | — | — |
| Slag 3 | 189 | 0.2 | 0.5 | 0.6 | 2.5 | 12.7 | 22.8 | (25.1) | (11.4) | (22.0) | — | 1.2 |

During processing batteries, no visible degradation of the magnesia-bearing refractory bricks was observed. Concentration of MgO in the obtained slag was only 1.2%, equivalent to 2.3 kg loss of MgO from the refractory bricks, which is considered low. The ratio $(CaO+2\ Li_2O+0.4\ MnO)/SiO_2$ was 4.3. This slag thus efficiently suppressed the wear of the furnace walls.

Comparative Example 4

500 kg of spent rechargeable Li-ion batteries were fed to a furnace with a diameter of 1 m, freshly lined with 200 mm chrome-magnesia refractory bricks. 50 kg of limestone and 50 kg of sand were added together with the Li-ion batteries. A bath temperature of 1450-1500° C. was maintained, which is suitable to maintain both the slag and the alloy sufficiently fluid for easy tapping and handling. The heat was supplied by the oxidation of Al and C in the batteries, using submerged $O_2$ injection. The injection rate was chosen to guarantee strongly reducing conditions, i.e. $pO_2$ of $10^{-9}$. Natural gas was added to compensate for heat losses in the furnace. After 1 h of heating, the produced alloy and slag were separated by tapping. Table 4 shows the analyses of the input and output phases of the process.

TABLE 4

Input and output phases of the process

| | Mass (kg) | Composition (%) | | | | | | | | | | |
|---|---|---|---|---|---|---|---|---|---|---|---|---|
| | | Ni | Co | Cu | Fe | $SiO_2$ | CaO | Al ($Al_2O_3$) | Li ($Li_2O$) | Mn (MnO) | C | MgO |
| Input | | | | | | | | | | | | |
| Batteries | 500 | 26.3 | 7.0 | 12.3 | 3.5 | — | — | 5.0 | 2.0 | 7.0 | 15 | — |
| Limestone | 50 | — | — | — | — | 4.8 | 53.3 | — | — | — | 11.4 | — |
| Silica | 50 | — | — | — | — | 100 | — | — | — | — | — | — |
| Output | | | | | | | | | | | | |
| Alloy | 241 | 54.6 | 14.1 | 25.2 | 5.5 | — | — | — | — | 0.6 | — | — |
| Slag 4 | 220 | 0.1 | 0.4 | 0.5 | 2.1 | 23.7 | 12.3 | (21.5) | (9.8) | (19.7) | — | 9.0 |

The concentration of MgO in the obtained slag was 9.0%, equivalent to 19.8 kg loss of MgO from the refractory bricks and thus significant wear of the furnace walls. The ratio $(CaO+2\ Li_2O+0.4\ MnO)/SiO_2$ was 1.7.

Example 5

500 kg of spent rechargeable Li-ion batteries were fed to a furnace with a diameter of 1 m, freshly lined with 200 mm chrome-magnesia refractory bricks. 50 kg of limestone and 50 kg of sand were added together with the Li-ion batteries. A bath temperature of 1450-1500° C. was maintained, which is suitable to maintain both the slag and the alloy sufficiently fluid for easy tapping and handling. The heat was supplied by the oxidation of Al and C in the batteries, using submerged $O_2$ injection.

The injection rate was chosen to guarantee strongly reducing conditions, i.e. $pO_2$ of $10^{-9}$. Natural gas was added to compensate for heat losses in the furnace. After 1 h of heating, the produced alloy and slag were separated by tapping. Table 5 shows the analyses of the input and output phases of the process.

TABLE 5

Input and output phases of the process

| | Mass (kg) | Ni | Co | Cu | Fe | $SiO_2$ | CaO | Al ($Al_2O_3$) | Li ($Li_2O$) | Mn (MnO) | C | MgO |
|---|---|---|---|---|---|---|---|---|---|---|---|---|
| Input | | | | | | | | | | | | |
| Batteries | 500 | 10.8 | 11.3 | 11.5 | 0.1 | — | — | 6.0 | 4.4 | 9.9 | 25 | — |
| Limestone | 50 | — | — | — | — | 4.8 | 53.3 | — | — | — | 11.4 | — |
| Silica | 50 | — | — | — | — | 100 | — | — | — | — | — | — |
| Output | | | | | | | | | | | | |
| Alloy | 164 | 32.8 | 32.9 | 33.2 | 0.4 | — | — | — | — | 0.8 | — | — |
| Slag 5 | 259 | 0.1 | 1.2 | 0.9 | 0.2 | 20.1 | 10.4 | (21.9) | (18.2) | (23.7) | — | 2.8 |

The concentration of MgO in the obtained slag was 2.8%, equivalent to 7.4 kg loss of MgO from the refractory bricks. The ratio $(CaO+2\ Li_2O+0.4\ MnO)/SiO_2$ was 2.8.

Discussion of Examples 3, 4, 5

In Examples 3 and Comparative Example 4, the same amount and composition of batteries were fed into the furnace, but with different ratios of limestone and sand. The resulting Slag 3 contained a higher concentration of CaO and a lower concentration of $SiO_2$ than Slag 4.

The ratio $(CaO+2\ Li_2O+0.4\ MnO)/SiO_2$ was 4.3 in Slag 3 and 1.7 in Slag 4, respectively. Only 2.3 kg of MgO was dissolved in Slag 3, while a significantly higher amount of 19.8 kg of MgO was dissolved in Slag 4.

In Example 5, batteries with a higher concentration of Mn and Li were fed into the furnace, while keeping the same ratio of limestone and sand as in Comparative Example 4. The resulting Slag 5 contained a higher concentration of MnO and $Li_2O$ than Slag 4.

The ratio $(CaO+2\ Li_2O+0.4\ MnO)/SiO_2$ was 2.8, while 7.4 kg of MgO were dissolved in Slag 5. This example thus demonstrates the beneficial effect of MnO and $Li_2O$ combined, while all other reaction conditions are kept the same.

Slags containing lower concentrations of $SiO_2$ and higher combined concentrations of $Li_2O$, CaO, and MnO are more suitable to suppress the MgO dissolution, as demonstrated in Examples 3 and 5.

Example 6

500 kg of spent rechargeable Li-ion batteries were fed to a furnace with a diameter of 1 m, freshly lined with 200 mm chrome-magnesia refractory bricks. 189 kg of slag produced in Example 3 was added together with the Li-ion batteries. A bath temperature of 1450-1500° C. was maintained, which is suitable to maintain both the slag and the alloy sufficiently fluid for easy tapping and handling. The heat was supplied by the oxidation of Al and C in the batteries, using submerged $O_2$ injection. The injection rate was chosen to guarantee strongly reducing conditions, i.e. $pO_2$ of $10^{-9}$. Natural gas was added to compensate for heat losses in the furnace. After 1 h of heating, the produced alloy and slag were separated by tapping. Table 6 shows the analyses of the input and output phases of the process.

TABLE 6

Input and output phases of the process

| | Mass (kg) | Composition (%) | | | | | | | | | | |
|---|---|---|---|---|---|---|---|---|---|---|---|---|
| | | Ni | Co | Cu | Fe | $SiO_2$ | CaO | Al ($Al_2O_3$) | Li ($Li_2O$) | Mn (MnO) | C | MgO |
| Input | | | | | | | | | | | | |
| Batteries | 500 | 26.3 | 7.0 | 12.3 | 3.5 | — | — | 5.0 | 2.0 | 7.0 | 15 | — |
| Slag former | 189 | 0.2 | 0.5 | 0.6 | 2.5 | 12.7 | 22.8 | (25.1) | (11.4) | (22.0) | — | 1.2 |
| Output | | | | | | | | | | | | |
| Alloy | 242 | 54.2 | 14.1 | 24.9 | 5.6 | — | — | — | — | 1.1 | — | — |
| Slag 6 | 308 | 0.2 | 0.5 | 0.7 | 2.8 | 7.8 | 14.0 | (30.7) | (14.0) | (26.9) | — | 1.2 |

During processing batteries, no visible degradation of the magnesia-bearing refractory bricks was observed. Concentration of MgO in the produced slag was only 1.2%, equivalent to 1.4 kg loss of MgO from the refractory bricks, which is an even smaller degradation than in Example 3. The ratio $(CaO+2\,Li_2O+0.4\,MnO)/SiO_2$ was 6.8. This slag thus efficiently suppressed the wear of the furnace wall made of magnesia-bearing refractory bricks.

General Conclusion

The metallurgical slags according to the present invention are suitable to recover valuable metals, such as Ni and Co, from Li-ion batteries or their waste, while minimizing degradation of the magnesia-bearing refractory bricks of the furnace.

The invention claimed is:

1. Process for the recovery of Ni and Co from Li-ion batteries or their waste, comprising the steps:
    providing a furnace lined with magnesia-bearing refractory bricks;
    providing a charge comprising slag formers, and Li-ion batteries or their waste; and,
    smelting the charge in reducing conditions, thereby obtaining an alloy containing the major part of the Ni and Co, and a slag;
    characterized in that the slag has a percent composition by weight according to:

$10\% < MnO < 40\%$;

$(CaO+1.5*Li_2O)/Al_2O_3 > 0.3$;

$CaO+0.8*MnO+0.8*Li_2O < 60\%$;

$(CaO+2*Li_2O+0.4*MnO)/SiO_2 > 2.0$;

$Li_2O > 1\%$; and, $Al_2O_3+SiO_2+CaO+Li_2O+MnO+FeO+MgO > 85\%$.

2. Process according to claim 1, wherein the content of MnO in the slag is greater than 10% and less than or equal to 30%.

3. Process according to claim 1, wherein the content of CaO in the slag is greater than or equal to 15% and less than or equal to 50%.

4. Process according to claim 1, wherein the content of $Al_2O_3$ in the slag is less than or equal to 50%.

5. Process according to claim 1, wherein the content of Fe in the slag is less than or equal to 25%.

6. Process according to claim 1, wherein the sum of $Al_2O_3$, $SiO_2$, CaO, $Li_2O$, MnO, FeO and MgO is greater than or equal to 90%.

7. Process according to claim 1, wherein $(CaO+2*Li_2O+0.4*MnO)/(SiO_2+0.2*Al_2O_3)$ is >1.5.

8. Process according to claim 1, wherein the step of smelting the charge is performed at a temperature of at least 1400° C. and at most 300° C. above the liquidus point of the slag, thereby avoiding overheating.

9. Process according to claim 1, the smelting step comprising the further steps:
    sampling the slag;
    cooling down the slag sample and assessing its color; and,
    in case the slag sample is green, terminating the smelting step; or,
    in case the slag sample is not green, proceeding with the smelting step after adjusting the $pO_2$-level to achieve more reducing conditions.

10. Process according to claim 1, wherein a $pO_2$-level is adjusted to $10^{-7} > pO_2 > 10^{-12}$.

11. Process according to claim 9, wherein the color of the slag is green.

12. Process according to claim 1, wherein the furnace is an electric furnace.

13. Process according to claim 1, wherein a Li-containing metallurgical slag partially or fully replaces slag formers in the step of providing a charge comprising slag formers, wherein the Li-containing metallurgical slag has a percent composition by weight according to:

$10\% < MnO < 40\%$;

$(CaO+1.5*Li_2O)/Al_2O_3 > 0.3$;

$CaO+0.8*MnO+0.8*Li_2O < 60\%$;

$(CaO+2*Li_2O+0.4*MnO)/SiO_2 > 2.0$;

$Li_2O > 1\%$; and, $Al_2O_3+SiO_2+CaO+Li_2O+MnO+FeO+MgO > 85\%$.

* * * * *